US012650796B2

(12) United States Patent
Sano

(10) Patent No.: US 12,650,796 B2
(45) Date of Patent: Jun. 9, 2026

(54) DISPLAY CONTROL SYSTEM AND DISPLAY CONTROL METHOD

(71) Applicant: Sharp NEC Display Solutions, Ltd., Tokyo (JP)

(72) Inventor: Keita Sano, Tokyo (JP)

(73) Assignee: Sharp NEC Display Solutions, Ltd., Tokyo (JP)

( * ) Notice: Subject to any disclaimer, the term of this patent is extended or adjusted under 35 U.S.C. 154(b) by 0 days.

(21) Appl. No.: 18/950,463

(22) Filed: Nov. 18, 2024

(65) Prior Publication Data

US 2025/0077154 A1      Mar. 6, 2025

Related U.S. Application Data

(63) Continuation of application No. PCT/JP2022/020906, filed on May 20, 2022.

(51) Int. Cl.
| | |
|---|---|
| *G06F 3/14* | (2006.01) |
| *G06V 20/50* | (2022.01) |
| *G06V 40/10* | (2022.01) |
| *G06Q 30/02* | (2023.01) |

(52) U.S. Cl.
CPC ................ *G06F 3/14* (2013.01); *G06V 20/50* (2022.01); *G06V 40/10* (2022.01); *G06Q 30/0281* (2013.01)

(58) Field of Classification Search
CPC .......... G06F 3/14; G06V 20/50; G06V 40/10; G06Q 30/0281; G06Q 10/02; G09F 27/00
See application file for complete search history.

(56) References Cited

U.S. PATENT DOCUMENTS

| | | | | |
|---|---|---|---|---|
| 2011/0293148 A1* | 12/2011 | Kobayashi | ............. | G06V 20/53 |
| | | | | 382/107 |
| 2012/0295597 A1* | 11/2012 | Louch | .................... | G06Q 10/02 |
| | | | | 455/414.1 |
| 2018/0357668 A1 | 12/2018 | Kanemoto et al. | | |

FOREIGN PATENT DOCUMENTS

| | | | |
|---|---|---|---|
| JP | 2017084083 A | * | 5/2017 |
| JP | 2018-169504 A | | 11/2018 |
| JP | 2019-066700 A | | 4/2019 |
| JP | 2022-067773 A | | 5/2022 |
| WO | WO 2017/098803 A1 | | 6/2017 |

OTHER PUBLICATIONS

International Search Report (ISR) (Form PCT/ISA/210), in PCT/JP2022/020906 dated Jun. 21, 2022.

* cited by examiner

*Primary Examiner* — Premal R Patel
(74) *Attorney, Agent, or Firm* — McGinn IP Law Group, PLLC

(57) ABSTRACT

The invention includes a camera that captures an image of a user, a first estimation unit that estimates attributes of the user included in the image captured by the camera, an extraction unit that extracts candidates from among services corresponding to the estimated attributes on the basis of an availability status of each service time frame, and a display control unit that displays the extracted candidates on a display screen.

11 Claims, 9 Drawing Sheets

FIG. 2

| | | GROUP ATTRIBUTES_PARENTS AND CHILDREN | | | | |
|---|---|---|---|---|---|---|
| | | | AVAILABILITY STATUS | | | |
| RANK | SCREENING ROOM | MOVIE TITLE | NEXT TIME 10：00−11：30 | SECOND TIME 13：30−15：00 | THIRD TIME 16：00−17：30 | FOURTH TIME |
| 1 | SCREEN Sa | MOVIE AAA | ○ | △ | ○ | — |
| 2 | SCREEN Sc | MOVIE BBB | × | × | × | 18：00−19：45 ○ |
| 3 | SCREEN Sb | MOVIE CCC | ○ | △ | ○ | — |
| 4 | SCREEN Sd | MOVIE DDD | × | ○ | ○ | — |
| 5 | SCREEN Se | MOVIE EEE | ○ | ○ | ○ | 18：15−19：50 ○ |

Figure 5:
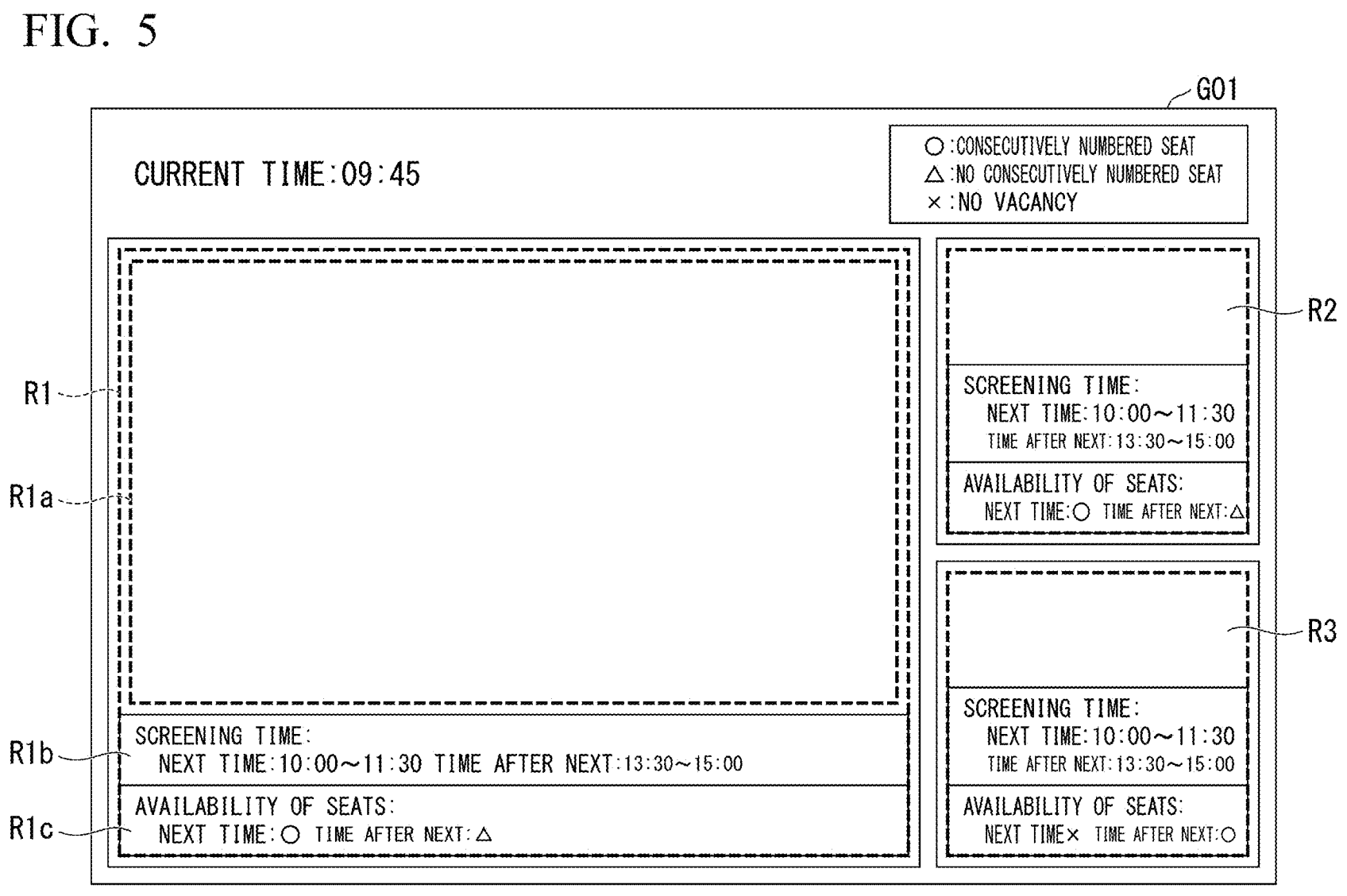

CURRENT TIME : 09 : 45

○ : CONSECUTIVELY NUMBERED SEAT
△ : NO CONSECUTIVELY NUMBERED SEAT
× : NO VACANCY

R2

SCREENING TIME:
    NEXT TIME : 10:00~11:30
    TIME AFTER NEXT : 13:30~15:00
AVAILABILITY OF SEATS:
    NEXT TIME : ○  TIME AFTER NEXT : △

R3

SCREENING TIME:
    NEXT TIME : 10:00~11:30
    TIME AFTER NEXT : 13:30~15:00
AVAILABILITY OF SEATS:
    NEXT TIME × TIME AFTER NEXT : ○

R1

R1a

SCREENING TIME:
    NEXT TIME : 10:00~11:30  TIME AFTER NEXT : 13:30~15:00

AVAILABILITY OF SEATS:
    NEXT TIME : ○  TIME AFTER NEXT : △

R1b

R1c

DISPLAY CONTROL SYSTEM AND DISPLAY CONTROL METHOD

TECHNICAL FIELD

The present invention relates to a display control system and a display control method.

BACKGROUND ART

Users may have a vague desire to watch a movie rather than making plans in advance to watch a specific movie or having already reserved an admission ticket. In such a case, a terminal device or the like may be used to search for a movie which is currently being screened, and confirm its screening time, and then determine whether the date and time and movie are desired by the user.

Patent Document 1 discloses a system that delivers benefit information to digital signage according to the number of seats available in a store.

CITATION LIST

Patent Document

[Patent Document 1]
Japanese Unexamined Patent Application, First Publication No. 2018-169504

SUMMARY OF INVENTION

Technical Problem

However, when determining which movie to watch, a user has to use an instrument such as a terminal device to search for a movie that interests him or her among movies currently being screened, which takes time and effort.

That is, in a case where a user uses a facility, it takes time and effort to search for a facility that may be suitable for the user.

Solution to Problem

According to an aspect of the present invention, there is provided a display control system including: a camera that captures an image of a user; a first estimation unit that estimates attributes of the user included in the image captured by the camera; an extraction unit that extracts candidates from among services corresponding to the estimated attributes on the basis of an availability status of each service time frame; and a display control unit that displays the extracted candidates on a display screen.

In addition, according to an aspect of the present invention, there is provided a display control method including: capturing an image of a user using a camera; estimating attributes of the user included in the image captured by the camera; extracting candidates from among services corresponding to the estimated attributes on the basis of an availability status of each service time frame; and displaying the extracted candidates on a display screen.

Advantageous Effects of Invention

According to the present invention, in a case where a user uses a facility, he or she can obtain information relating to a facility that may be suitable for him or her without taking time and effort to search for a facility that may be suitable for him or her.

BRIEF DESCRIPTION OF DRAWINGS

FIG. 2 is a diagram illustrating an example of list data stored in a storage unit 31.

FIG. 5 is a diagram illustrating an example of display content to be displayed on a display unit 13.

DESCRIPTION OF EMBODIMENTS

Next, the present embodiment will be described.

Figure 1:
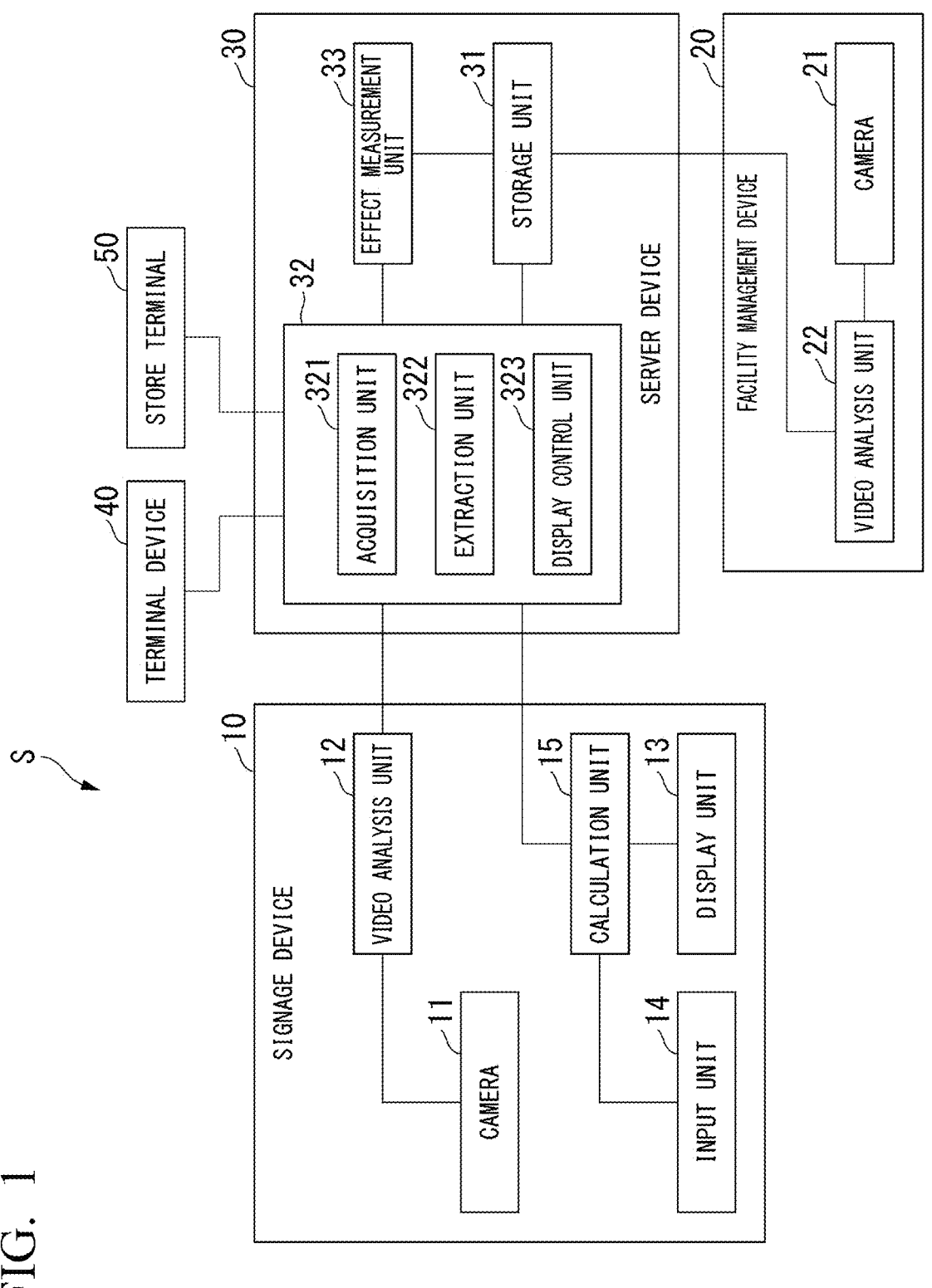
FIG. 1 is a conceptual diagram illustrating a display system S using a signage device.

FIG. 1 is a conceptual diagram illustrating a display system S using a signage device.

The display system S includes a signage device 10, a facility management device 20, and a server device 30.

The signage device 10 and the server device 30 are communicably connected to each other through a wired or wireless network or the like. The facility management device 20 and the server device 30 are communicably connected to each other through a wired or wireless network or the like.

The display system S uses the signage device 10 to provide users (visitors) with guidance display relating to services to be provided. The content of the guidance display need only include content that allows the user to ascertain whether the service can be provided. In addition, the content of the guidance display may include content for guiding the user to a facility for providing the service. Here, the facility may be a location which is a candidate for a plurality of guidance destinations. For example, in a case where the facility is a large commercial facility, guidance information can be displayed with one of the plurality of facilities included in the large commercial facility as a facility which is a candidate for the guidance destination. In addition, in a case where the facility is one store and the store includes a plurality of booths, guidance information can be displayed with one of the plurality of booths as a candidate for the guidance destination.

In this embodiment, a case where a large commercial facility houses a plurality of facilities such as restaurants, apparel shops, and movie theaters will be described. In addition, a case where a plurality of screening rooms are provided in a movie theater will be described.

The signage device 10 is installed in a large commercial facility, and is installed, for example, in at least any one location of the entrance of a large commercial facility, the vicinity of an elevator, the vicinity of the entrance of a movie theater, and the like.

The signage device 10 is installed in the vicinity of a movie theater, for example, in at least any one location of the entrance of a large commercial facility with a movie theater attached, the front of an elevator, the entrance of a movie theater, and the like.

The signage device 10 includes a camera 11, a video analysis unit 12, a display unit 13, an input unit 14, and a calculation unit 15.

The camera 11 is attached to the top of the signage device 10. The camera 11 captures an image of a region including a position at which the display screen of the signage device 10 is visible.

The video analysis unit 12 has a function as a first estimation unit that estimates attributes of a user included in a captured image of the user.

The video analysis unit 12 transmits attribute information indicating the estimated attributes to the server device 30.

The display unit 13 displays content. The display unit 13 includes, for example, a liquid crystal panel and a drive circuit. The drive circuit outputs a drive signal to the liquid crystal panel. The liquid crystal panel displays an image according to content by driving an element of each pixel in accordance with a drive signal which is output from the drive circuit.

The input unit 14 accepts an operation input from the user. The input unit 14 may be combined with the display unit 13 and configured as a touch panel.

The calculation unit 15 causes the display unit 13 to display content on the basis of data relating to a plurality of movies to be displayed which is received from the server device 30. This content includes content that provides guidance relating to the plurality of movies to be displayed, and includes, for example, content that provides guidance relating to three movies.

The facility management device 20 is provided in a facility which is a candidate for a guidance destination.

The facility management device 20 includes a camera 21 and a video analysis unit 22.

The camera 21 captures images inside a facility. Here, the facility is a movie theater. The camera 21 captures images inside the movie theater. More specifically, the camera captures an image of a region of the movie theater including the vicinity of the exit of the screening room, and captures an image of a user coming out of the screening room. Here, in a case where the exits of a plurality of screening rooms are located at a distance from each other, a plurality of cameras 21 may be prepared and a different camera 21 may be installed at each of the exits.

The video analysis unit 22 has the function of a second estimation unit that extracts a person from the captured image obtained from the camera 21 and estimates the attributes of a user included in the captured image of the user coming out of the facility (in this case, the screening room).

The video analysis unit 22 transmits the analysis results to the server device 30.

The server device 30 includes a storage unit 31, a calculation unit 32, and an effect measurement unit 33.

The storage unit 31 stores various types of data.

The storage unit 31 stores the availability status of each time frame for a plurality of facilities in each attribute given to the facilities.

In the storage unit 31, rankings among attributes are allocated to a plurality of facilities.

FIG. 2 is a diagram illustrating an example of list data stored in the storage unit 31. The list data includes items such as a ranking, a screening room, a movie title, and an availability status. The ranking represents the priority recommended to the user in the group attributes. The ranking may be a popularity ranking. The screening room is a facility housed in a movie theater. The movie theater houses at least one facility (screening room). The movie title is the name of a movie which is being screened at the movie theater. The availability status indicates whether each of a plurality of facilities is available for each time frame. The time frame is a slot of time divided in a facility indicating a time slot from a start time to an end time. In a case where there are multiple time frames on that day, each time frame is stored in the order of the start time such as next time, second time, and third time.

For example, the movie "AAA" ranked first is screened in the screening room "Screen Sa," the next time frame is "10:00 to 11:30," the availability status is "○," indicating that there is sufficient vacancy, the second time frame is "13:00 to 11:30," and the availability status is "Δ," indicating that there is little vacancy. Here, in a case where the availability status is "x," it indicates that there is no vacancy.

The calculation unit 32 includes an acquisition unit 321, an extraction unit 322, and a display control unit 323.

The acquisition unit 321 acquires a desired time slot during which the user uses the facility. The desired time slot may be input from the touch panel (the input unit 14) of the signage device 10. In addition, in a case where the desired time slot is not input from the touch panel, the acquisition unit 321 may acquire a certain time from a point in time when the user stands in front of the signage device 10 (imaged by the camera 11) as the desired time slot. In this case, the user does not need to perform an operation for inputting the desired time slot.

The extraction unit 322 extracts candidates from among the services corresponding to the estimated attributes on the basis of the availability status of each time frame of the service. The number of candidates may be one or plural.

The extraction unit 322 extracts a plurality of candidates from among the facilities corresponding to the estimated attributes on the basis of the availability status of time frames according to the desired time slot.

The extraction unit 322 extracts, as the candidates to be displayed, facilities corresponding to the extraction condition in a relationship between the desired time slot and the availability status of the time frame from among a plurality of facilities corresponding to the estimated attributes in descending order of the ranking.

In a case where the number of candidates extracted as the candidates to be displayed does not reach the number of candidates to be displayed, the extraction unit 322 extracts, as candidates to be displayed, facilities having a high priority among facilities that do not correspond to the extraction condition.

In a case where the extraction condition is a first condition regarding whether the time from the start time of the desired time slot to the start time of the time frame is within a first reference time, the extraction unit 322 extracts facilities which are available in a time frame within the first reference time as facilities corresponding to the extraction condition.

The first reference time can be determined in accordance with the amount of time that the user can wait in the vicinity of the guidance destination between any timing of his/her leisure time and the start time of the time frame in which the facility can be used. For example, in a case where the facility is a screening room of a movie theater and the time frame is a period from the start of screening of a certain movie to the end of the screening, it is the amount of time that the user is able to wait in the vicinity of the screening room. In this case, when the user has to wait longer than the first reference time, he or she may be able to make better use of his/her leisure time by visiting other facilities within the commercial complex, returning to the movie theater, and entering the screening room. In addition, in a case where the waiting time is shorter than the first reference time, the user can use the goods sales booth near the screening room, view advertisements, wash his/her hands, and the like, and wait for the screening to start. In this embodiment, a case where the first reference time is set to 30 minutes will be described as an example.

In a case where the number of users included in the captured image is plural and the extraction condition is a second condition regarding whether a plurality of users can use adjacent seats in the facility, the extraction unit 322 extracts facilities where the adjacent seats can be used as facilities corresponding to the extraction condition.

In a case where the extraction condition is a third condition regarding whether the time from the start time of the desired time slot to the start time of the time frame is equal to or longer than a second reference time shorter than the first reference time, the extraction unit 322 extracts facilities which are available in a time frame equal to or longer than the second reference time as facilities corresponding to the extraction condition.

The second reference time is set as a time between any timing in the user's leisure time and the start time of the time frame in which the facility can be used, which is enough time to view the content on the signage device 10 and then enter the screening room. For example, the second reference time is determined in accordance with the time required for the user to view the content for guiding the user to the screening room of the movie theater on the signage device 10 and then move to the screening room shown in the content. Here, the second reference time may be set by taking into account not only the travel time but also the time to purchase food or drinks to eat or drink during the screening at a store located in the vicinity of the screening room before entering the screening room. The second reference time can be used, for example, to determine whether it is possible to enter the screening room in time for the next movie screening start time after viewing the guidance of the signage device 10.

In this embodiment, it is assumed that the signage device 10 is installed near the entrance of a movie theater, and a case where the second reference time is set to 10 minutes will be described as an example.

In a case where the extraction condition is a fourth condition regarding whether there is a vacancy in the time frame closest to the start time of the desired time slot, the extraction unit 322 extracts a facility having a vacancy in the closest time frame as a facility corresponding to the extraction condition.

For facilities that do not correspond to any of the first to fourth conditions, in a case where the first condition is assumed to have the highest priority in the priority table in the order of the first condition to the fourth condition, and the number of candidates extracted as the candidates to be displayed does not reach the number of candidates to be displayed, the extraction unit 322 extracts the facilities as candidates to be displayed in order of the priority.

The order of the first condition to the fourth condition can be determined according to the order of priority acceptable to the user. For example, the first condition may have the highest priority, and the fourth condition may have the lowest priority. The user is more likely to tolerate facilities that satisfy these high priority conditions.

The effect measurement unit 33 has the function of a first update unit that updates the rankings among attributes for the plurality of facilities on the basis of the estimation results of the video analysis unit 12 (second estimation unit).

The display control unit 323 calculates a movie to be displayed in accordance with a movie that matches the attributes from data of the data unit, the screening start time, and the availability of seats, and transmits the calculated movie to the signage device 10.

In a case where facilities that do not correspond to the fourth condition are displayed on the display screen, the display control unit 323 displays the availability status of the second closest time frame from the start time of the desired time slot in the facilities that do not correspond to the fourth condition.

The display control unit 323 causes the plurality of extracted candidates to be displayed on the display screen of the signage device 10 by transmitting them to the signage device 10.

The effect measurement unit 33 determines whether the user who viewed the signage device 10 has left the screening room on the basis of the captured image obtained from the signage device 10 and the captured image obtained from the facility management device 20. Here, a user's face image is extracted from the captured image of a user who viewed the signage device 10, a user's face image is extracted from the captured image obtained from the facility management device 20, and it is determined whether there is a matching user. In a case where there is a matching user, it is determined that the user who viewed the signage device 10 has left the screening room, and the actual value of the measurement result is added, assuming that the user has been attracted to the movie by display on the signage device 10.

The effect measurement unit 33 has the function of a second update unit that updates the rankings among the attributes of a plurality of facilities on the basis of the user's attributes in a case where a facility to be used is reserved by the user from among candidates of the facilities displayed on the display screen.

This makes it possible to measure the effectiveness of the advertisement caused by the signage device 10 providing guidance to the facility without confirming whether the user has actually visited the facility.

Figure 3:
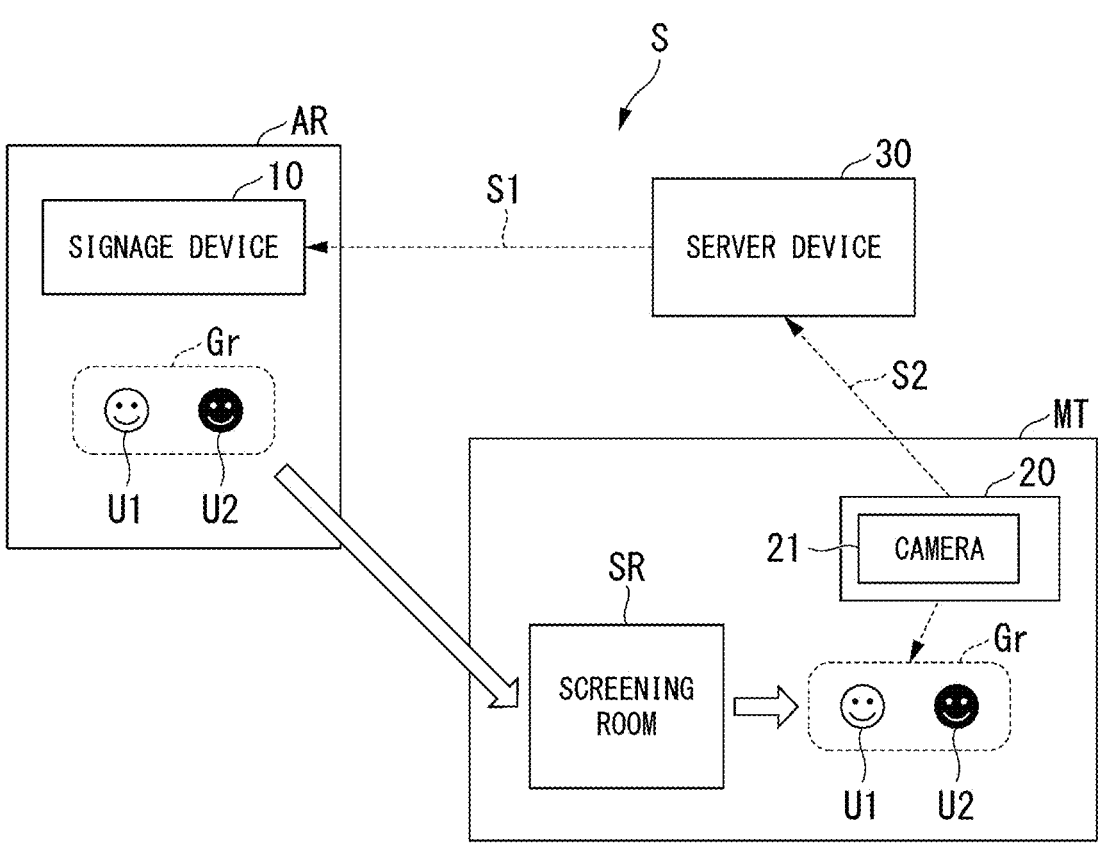
FIG. 3 is a conceptual diagram illustrating the overall flow in the display system S.

FIG. 3 is a conceptual diagram illustrating the overall flow in the display system S.

The camera of the signage device 10 captures an image of an imaging target region.

When a group Gr including a user U1 and a user U2 arrives in front of the signage device 10, the camera of the signage device 10 captures an image of the group Gr including the user U1 and the user U2. The signage device 10 estimates how many users are included in the captured image and the user attributes which are the attributes of each user. These attributes include, for example, age and sex. The signage device 10 estimates group attributes which are attributes for a group on the basis of a combination of user attributes of each user included in the image. The group attributes are, for example, parents and children, members of the same sex, members of the opposite sex, and the like.

The server device 30 accesses the storage unit 31 and picks up some of the top movie rankings by group attribute corresponding to the group attributes estimated in the signage device 10. The server device 30 further acquires the time until the next screening and the availability of seats at that point in time from the storage unit 31, transmits movies that can be immediately watched by the user and that correspond to the user's tendencies (group attributes), as a popularity ranking, to the signage device 10 (step S1), and display the movies.

In addition, the camera 21 of the facility management device 20 installed in a movie theater MT acquires whether users who actually visited the movie theater have watched the movie by capturing an image of the vicinity of the exit of the screening room SR, and feeds it back to the ranking in the database (step S2).

When the group Gr of the user U1 and the user U2 stands in front of the signage device 10, the group can confirm the advertisement of a movie that can be watched immediately according to the group attributes on the display screen of the signage device 10. Based on the image captured by the camera 21 installed in the movie theater MT, it is determined whether he or she has actually visited the movie theater in order to watch a movie and which movie the user has watched, and the list data in the storage unit 31 is updated. Thereby, feedback can be provided as an advertisement to be displayed the next time a user of the same group attribute comes in front of the signage device 10.

Figure 4:
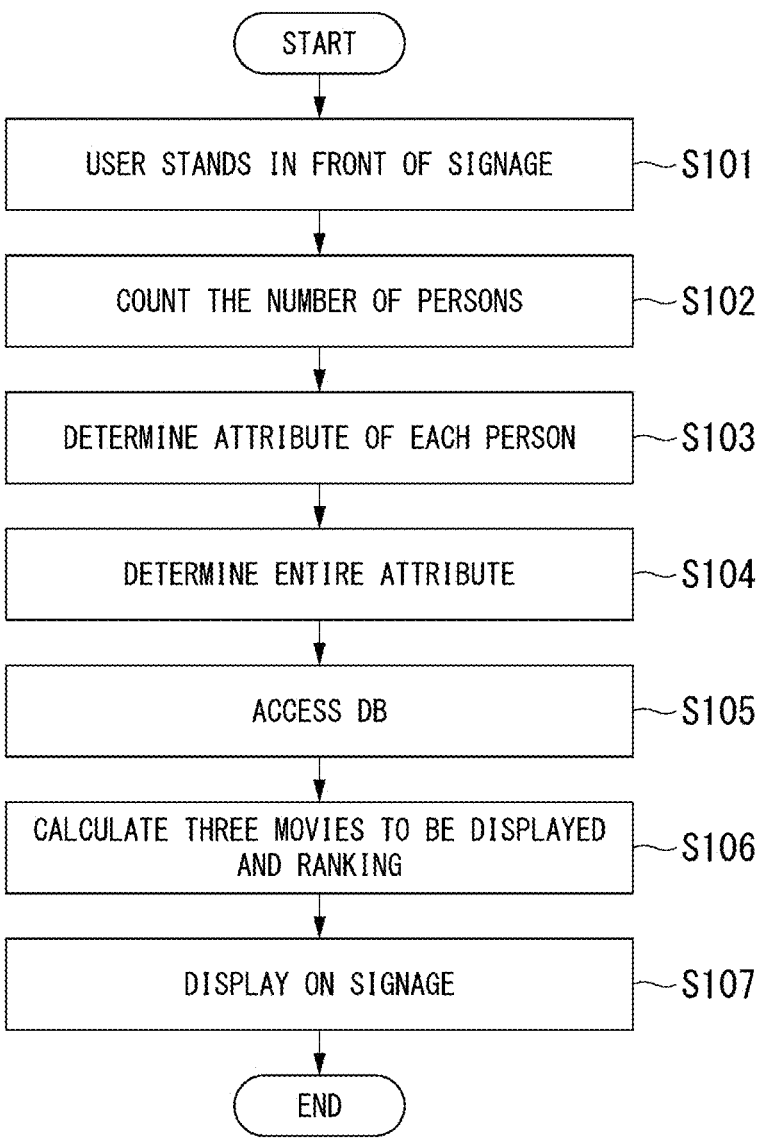
FIG. 4 is a flowchart illustrating processing of the display system S.

FIG. 4 is a flowchart illustrating processing of the display system S.

Here, as a preparation before displaying the content on the signage device 10, the screening schedule, screening room, and ranking of the currently released movie are stored in advance in the storage unit 31 for each group attribute. For example, based on the evaluation of movies published on the Internet, the total results which are totalized by adding the ticket sales results for each movie at the movie theater using the signage device 10 to the point table as point data for each attribute, and the like, a ranking for each movie is generated for each group attribute and stored in the storage unit 31.

First, a user arrives at a commercial complex, arrives at a location where the signage device 10 is installed, and stands within the imaging range of the camera 11 (step S101). The camera 11 of the signage device 10 captures an image of the imaging range at regular intervals of time, and sequentially outputs the imaging results to the video analysis unit 12. Here, in a case where the user does not input an instruction for designating a desired time slot in the signage device 10, the server device 30 acquires a certain time from the current time (the time at which an image of the user is captured) as the desired time slot.

The video analysis unit 12 extracts persons from the captured image obtained from the camera 11, and counts the number of extracted persons (step S102). Next, the video analysis unit 12 estimates user attributes for each of the extracted persons on the basis of the person's image (step S103). When the user attributes of each user included in the image are estimated, the group attributes for the group including the plurality of imaged persons are estimated on the basis of the combination of the estimated user attributes (step S104). Here, in a case where a plurality of users comes together and are imaged by the camera 11 of the signage device 10, the plurality of imaged users can be recognize as one group and group attributes can be assigned. In a case where one user visits and is imaged by the camera 11 of the signage device 10, the one imaged user can be recognized as one group containing only one person, and the group attributes can be assigned.

Next, the video analysis unit 12 transmits the group attributes and the number of people constituting the group to the server device 30, and transmits a request for generation of content.

When the group attributes are receive, the extraction unit 322 of the server device 30 accesses the storage unit 31 on the basis of the received group attributes (step S105), extracts three movies to be displayed, and calculates their rankings (the details of which will be described later) (step S106).

When the three movies to be displayed are extracted and their rankings are calculated, the display control unit 323 of the server device 30 transmits display data including the results to the signage device 10 for display.

When the display data is received from the server device 30, the calculation unit 15 of the signage device 10 displays the display data on the display unit 13 (step S107).

FIG. 5 is a diagram illustrating an example of display content to be displayed on the display unit 13.

In a case where the number of movies to be displayed on the display unit 13 (the number of display targets) is set to three, three regions (region R1, region R2, and region R3) for providing guidance about movies are allocated to this display screen G01.

The region R1 is a region displayed for a movie which is a first candidate, the region R2 is a region displayed for a movie which is a second candidate, and the region R3 is a region displayed for a movie which is a third candidate. Here, among the region R1, the region R2, and the region R3, the region R1 is set to have the largest size (for example, area) on the display screen, and R3 is set to have the smallest size.

The calculation unit 15 of the signage device 10 allocates the first candidate to the region R1, allocates the second candidate to the region R2, allocates the third candidate to the region R3, and displays them on the display unit 13.

The region R1 includes an introduction region (for example, a region R1*a*) in which an introductory sentence, an introductory video, and the like regarding the movie are displayed, a time frame region (for example, a region R1*b*) in which the next screening time frame and the second screening time frame based on the current time are displayed, and an availability status region (for example, a region R1*c*) in which the availability status in a time frame is displayed.

The user can select which movie to watch by looking at the display screen displayed on the signage device 10. Here, in a case where a plurality of users watch the same movie together as one group, movies according to the group attributes are displayed as recommended movies on the display screen, making it easier to select which movie to watch.

In addition, since the time frame and the availability status can also be ascertained, it is easy to confirm and determine whether the movie can be watched immediately or can be watched by waiting a little while.

After a group of users selects a movie to watch from among the movies displayed on this display screen, the group purchases tickets and enters the screening room. This makes it possible for the users to watch the video.

In a case where such display is made, the signage device 10 can guide the availability status of each screening room. In addition, the signage device 10 can also guide the availability status of each movie on the basis of the availability status of the screening room. Here, when watching movies, sports, and the like, in addition to providing guidance on whether a facility (screening room) has vacancies, it is possible to provide guidance on whether there are vacancies for each movie to be screened, guidance on whether there are vacancies for each sport event to be watched, or the like. That is, it may be possible to provide guidance on whether there are vacancies for each service providing location, or to provide guidance on whether there are vacancies for each type of service.

In this drawing, a case where the number of display targets is three has been described, but the number may be two or four or more. In a case where the number of display targets is too large, it will be difficult for the user to select a movie to watch, and thus the preferred number of display targets is around three to five.

Figure 6:
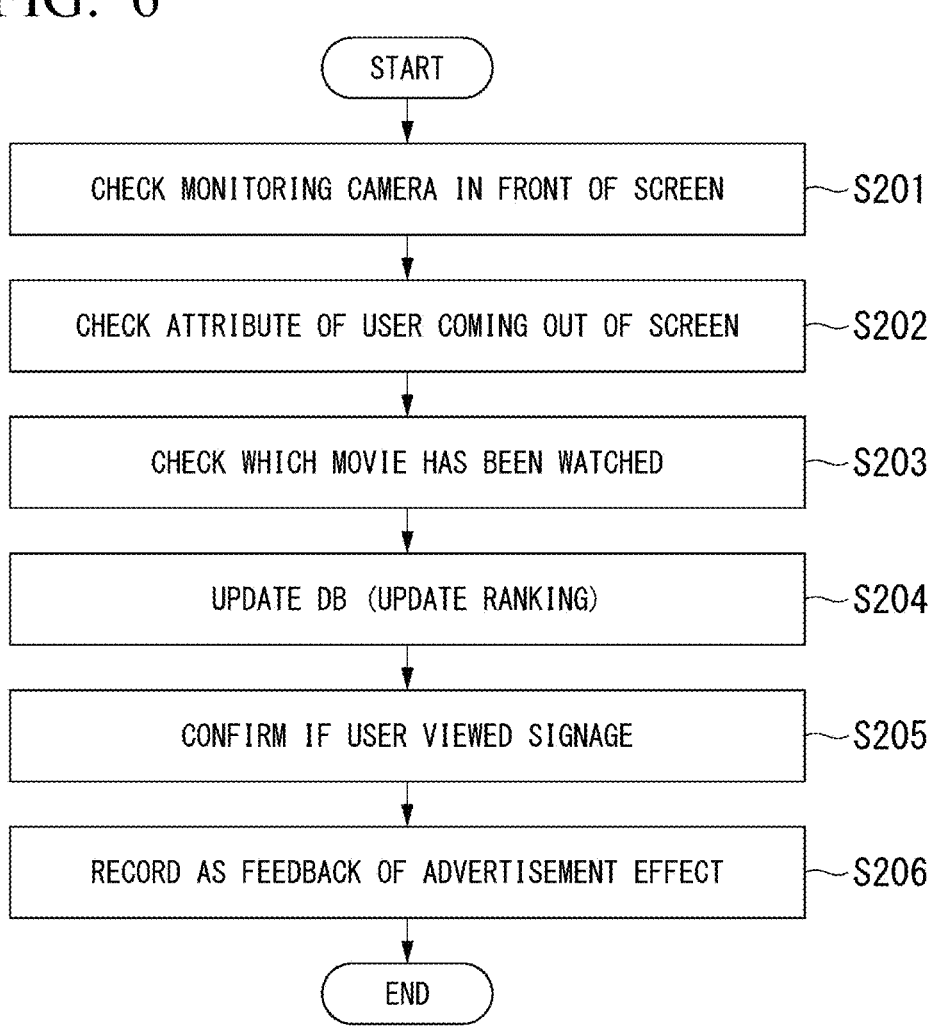
FIG. 6 is a flowchart illustrating a process of feeding back information obtained from a facility management device 20 to a server device 30.

FIG. 6 is a flowchart illustrating a process of feeding back information obtained from the facility management device 20 to the server device 30.

When the user finishes watching the movie, he or she leaves the screening room. The camera 21 of the facility management device 20 captures an image of the vicinity of the exit of the screening room, and outputs the imaging result to the video analysis unit 22. Here, when a user passes through the exit of the screening room, the camera 21 captures an image of a region including the user in the vicinity of the exit. The video analysis unit 22 checks the captured image obtained from the camera 21 (step S201).

Specifically, the video analysis unit 22 extracts persons from the captured image obtained from the camera 21, and estimates user attributes for each of the extracted persons on the basis of the person's image (step S202). When the user attributes of each user included in the image are estimated, the group attributes for a group including the plurality of imaged persons are estimated on the basis of the combination of the estimated user attributes. Here, in a case where a plurality of users exit together and are imaged by the camera 21, the plurality of imaged users can be recognized as one group and group attributes can be assigned. In a case where one user exits from the exit and is imaged by the camera 21, the one imaged user can be recognized as one group containing only one user and group attributes can be assigned.

When the group attributes are obtained, the video analysis unit 22 determines which exit of the screening room the person has exited from. Here, the video analysis unit 22 can specify which screening room the user has exited from by detecting which of the exits imaged by the camera 21 has been imaged by the camera 21, and identifies which movie has been watched on the basis of the time of exit and the screening schedule (step S203).

The video analysis unit 22 transmits the estimated group attributes and information indicating the watched movies to the server device 30 as actual results data.

When the actual results data is received from the facility management device 20, the server device 30 updates the ranking in the list data on the basis of the group attributes and the watched movies included in the actual results data (step S204).

This update involves updating the point table by adding points to the group attributes included in the actual results data among the total results corresponding to the watched movies in the above-described total results.

When the users leave the screening room sequentially from the exit, the users are imaged by the camera 21, the group is recognized by the video analysis unit 22, and the group attributes are estimated. The point table is sequentially updated accordingly. When the point table is updated, the ranking of movies is updated for each group attribute on the basis of the number of points.

The accuracy of the ranking of movies can be improved by updating the ranking of movies for each group attribute on the basis of the number of points.

The video analysis unit 22 transmits the captured image of the group of users to the server device 30 with respect to the captured image obtained from the camera 21. Here, one captured image for one group is transmitted to the server device 30.

When the captured image is received from the facility management device 20, the server device 30 stores it in the storage unit 31. The effect measurement unit 33 of the server device 30 determines whether the user who viewed the display content of the signage device 10 and the user who exited the screening room match on the basis of the image data obtained from the signage device 10 and the image data obtained from the facility management device 20 (step S205). In a case where the users match, the actual value of the measurement result indicating the effect of displaying the recommended movie by the signage device 10 is updated (step S206).

This makes it possible to measure the effect of displaying the recommended movie by the signage device 10.

Next, a process of calculating display content to be displayed on the signage device 10 in step S106 described above will be described.

Figure 7:
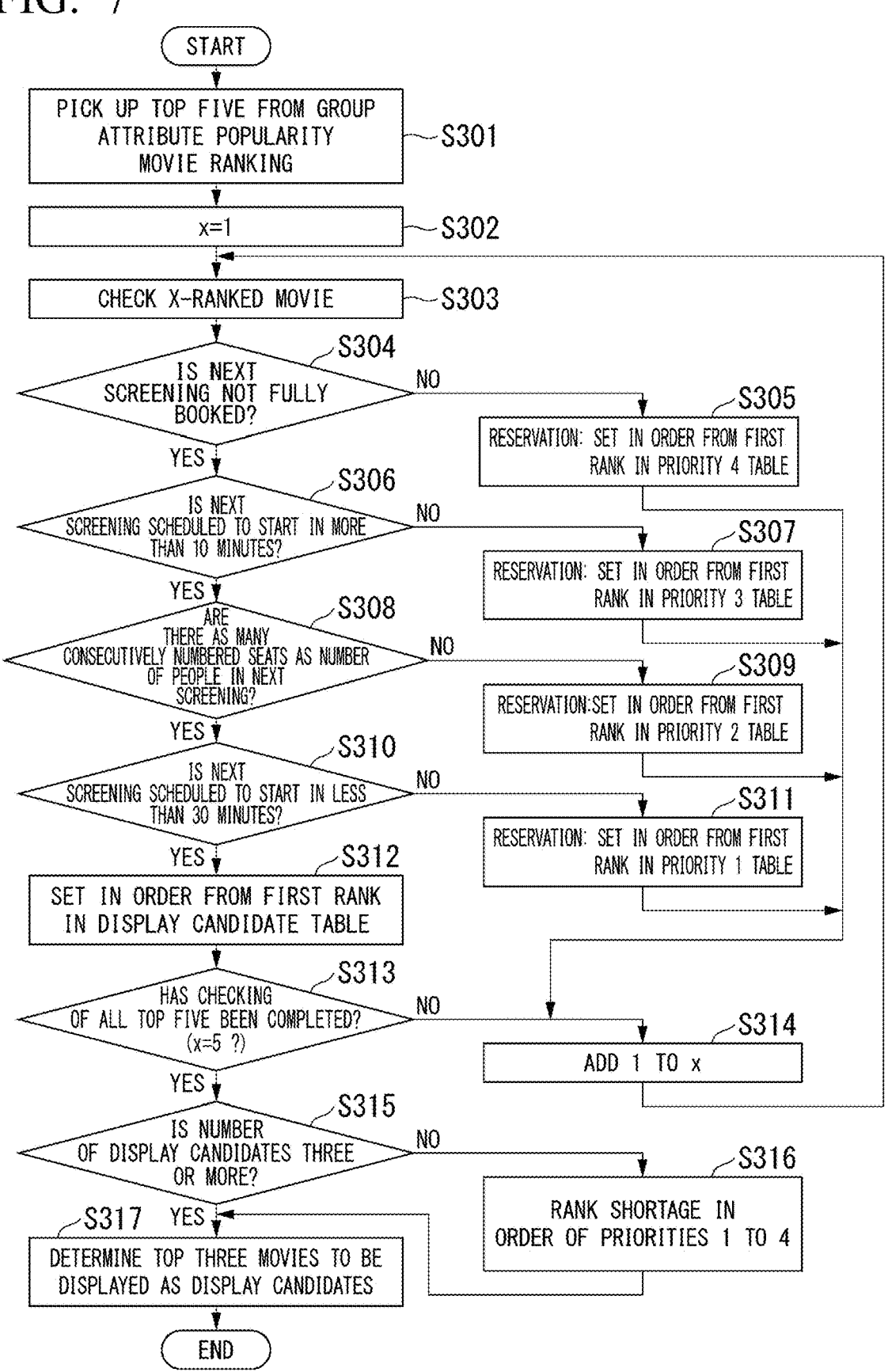
FIG. 7 is a flowchart illustrating a process of calculating display content to be displayed on a signage device 10.

FIG. 7 is a flowchart illustrating a process of calculating display content to be displayed on the signage device 10.

In the server device 30, the acquisition unit 321 of the calculation unit 32 acquires the desired time slot for the user to use the facility. Here, in a case where the user does not input an instruction for designating the desired time slot in the signage device 10, the desired time slot is assumed to be a certain time from the current time, and a certain time from the current time is acquired as the desired time slot. Since the user comes to watch a movie for a certain period of time, it is considered that the user has secured time to watch a movie at a typical running time. Therefore, a certain time can be determined on the basis of the average running time of a movie. For example, in a case where the average running time is 100 minutes, a certain time can be set to 120 minutes by adding extra time to that time.

Next, the extraction unit 322 obtains ranking data for the top five ranks by referring to the storage unit 31 and extracting the ranks from first to fifth among the list data corresponding to the group attributes received from the signage device 10 (step S301).

The extraction unit 322 adds 1 to the counter value (step S302), extracts a movie having a ranking corresponding to the value indicated by the counter value from the ranking data, and sets it as a check target (step S303). Here, a movie ranked first is a check target.

The extraction unit 322 determines whether there is a vacancy in the next time frame with respect to the movie ranked first (not fully booked) (step S304). The extraction unit 322 advances the process to step S306 in a case where the next time frame is not fully booked (step S304—YES), and stores the movie ranked first in the top of the vacant region in the fourth priority table in a case where the next time frame is fully booked (step S304—NO) (step S305). After step S305, the server device 30 adds 1 to the counter value (step S314), and advances the process to step S303.

The extraction unit 322 determines whether the time from the current time to the screening start time of the next time frame is equal to or longer than the second reference time (for example, 10 minutes) with respect to the movie ranked first (step S306). The extraction unit 322 advances the process to step S308 in a case where the time until the screening start time of the next time frame is equal to or longer than the second reference time (step S306—YES), and stores the movie ranked first at the top of the vacant region in the third priority table in a case where the time is less than the second reference time (step S306—NO) (step S307). After step S307, the server device 30 adds 1 to the counter value (step S314), and advances the process to step S303.

Next, the extraction unit 322 determines whether there are as many adjacent vacant seats (consecutively numbered seats) as the number of people constituting the group on the basis of the positions of vacant seats in the next time frame with respect to the movie ranked first (step S308). The vacant seats can be ascertained on the basis of ticket sales data that is stored in a ticket sales management server managed by the movie theater and makes it possible to ascertain which reserved seats have been sold and which reserved seats are vacant. The extraction unit 322 can determine whether there are as many adjacent seats as the number of people in the group by referring to this ticket sales data. The number of people constituting the group can be ascertained by receiving the number of people counted in step S102 together with the group attributes from the signage device 10.

The extraction unit 322 advances the process to step S310 in a case where there are as many adjacent vacant seats as the number of people (step S308—YES), and stores the movie ranked first in a case where there are not as many adjacent vacant seats as the number of people (step S308—NO) at the top of the vacant region in the second priority table (step S309). After step S309, the server device 30 adds 1 to the counter value (step S314), and advances the process to step S303.

Next, the extraction unit 322 determines whether the time from the current time to the screening start time of the next time frame is within the first reference time (for example, 30 minutes) with respect to the movie ranked first (step S310). The extraction unit 322 advances the process to step S312 in a case where the time until the screening start time of the next time frame is within the first reference time (step S310—YES), and stores the movie ranked first at the top of the vacant region in the first priority table in a case where the time exceeds the first reference time (step S310—NO) (step S311). After step S311, the server device 30 adds 1 to the counter value (step S314), and advances the process to step S303.

In step S311, the extraction unit 322 stores the movie for which the time until the screening start time of the next time frame is determined to be within the first reference time at the top of the vacant region in the display candidate table (step S312).

Next, the extraction unit 322 determines whether checking of all ranks of ranking data for the top five ranks has been completed (whether the counter value has reached 5) (step S313), advances the process to step S315 in a case where checking of all ranks has been completed (step S313—YES), and adds 1 to the counter value (step S314) in a case where the checking is not completed (step S315—NO), and advances the process to step S303. By proceeding to step S303, the same check process is performed on the next ranked (here, for example, second-ranked) movie.

Next, the extraction unit 322 determines whether the number of movies stored in the display candidate table is three or more (step S315). In a case where the number of movies stored in the display candidate table is three or more (step S315—YES), the top three movies stored in the display candidate table are extracted as movies to be displayed (step S317).

One the other hand, in a case where the number of movies stored in the display candidate table is less than 3 which is the number of display targets (step S315—NO), the extraction unit 322 extracts movies in descending order of priority from the priority table until the insufficient number of movies are extracted (step S316). Here, the extraction unit 322 extracts movies by referring to the first priority table, the second priority table, the third priority table, and the fourth priority table in this order. When movies are extracted from the priority tables to replenish the shortage in the display candidate table until the number of display targets is reached, the movies are extracted as movie to be displayed (step S317).

In a case where the movie extracted from the first priority table is displayed on the signage device 10, the user can watch the movie by waiting for a certain amount of time, and thus he or she can roam, for example, other stores and facilities within the commercial complex, return to the movie theater a little before the screening time, and watch the movie.

In a case where the movie extracted from the second priority table is displayed on the signage device 10, users belonging to a group cannot sit in adjacent seats but can watch the movie. Before and after a movie is screened in the screening room, users in a group may converse with each other, but during the screening, the users often watch the movie alone without any conversation. Therefore, although the users are seated apart from each other, they can watch movies in the same time frame.

In a case where the movie extracted from the third priority table is displayed on the signage device 10, users belonging to a group can watch the movie by promptly entering the screening room. Even if it takes some time to purchase tickets, and the like, there is little influence on the viewing off the main film because advertisements and the like are screened immediately after the screening start time.

In a case where the movie extracted from the fourth priority table is displayed on the signage device 10, the next time frame is fully booked, but users belonging to a group can confirm the availability status of the second time frame, and if it appears to be vacant, the users can watch the movie in the second time frame. In this case, they can roam around the commercial complex until the screening start time of the second time frame arrives.

Figure 8:
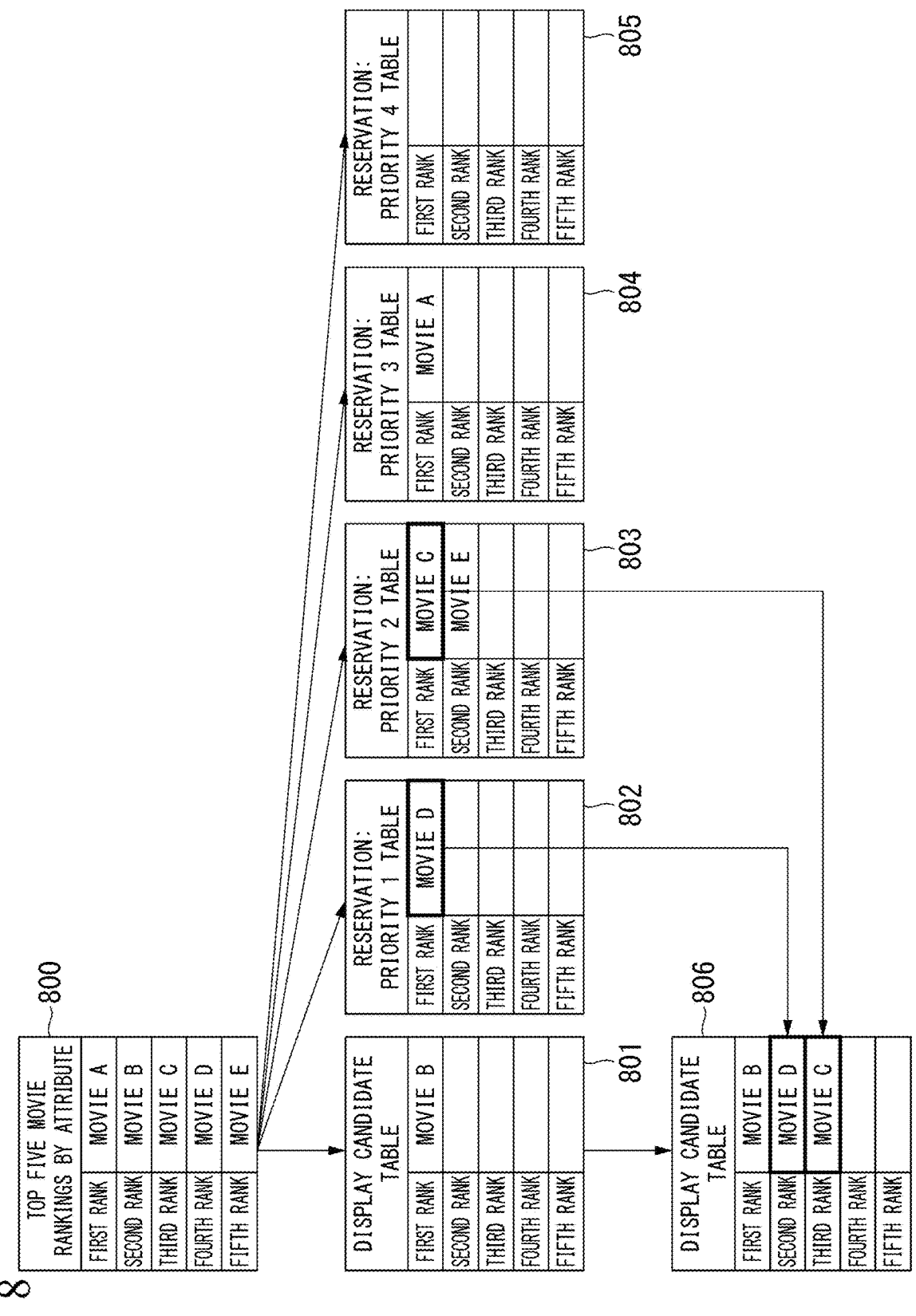
FIG. 8 is a conceptual diagram illustrating a relationship between a display candidate table and a priority table.

FIG. 8 is a conceptual diagram illustrating a relationship between a display candidate table and a priority table.

The extraction unit 322 determines whether the movies included in the list data (reference sign 800) match the extraction conditions, starting from the movie having the highest ranking, and writes the matching movies into the display candidate table (reference sign 801). Movies that do not match the extraction conditions are written into a priority table according to the conditions that do not match (reference sign 802, reference sign 803, reference sign 804, and reference sign 805). In the case of not being less than the number of display targets, the extraction unit 322 extracts it from the priority table and adds it to the display candidate table (reference sign 806).

In the example in this drawing, the result of determining whether to match the extraction conditions is that only "Movie B" is written in the display candidate table. For this reason, "Movie D" stored in the first priority table is written to the second place in the display candidate table, and "Movie C" stored in the second priority table is written to the third place in the display candidate table.

Thereby, movies to be displayed are extracted so that the number of display targets reaches "3."

Here, by giving priority to the movies stored in the first priority table over the second priority table and writing them into the display candidate table, a movie having a high priority can be added to the highest vacant rank in the display candidate table.

In the embodiment described above, a case where the desired time slot is a certain period of time from a point in time when the user stands in front of the signage device 10 has been described, but the user may input the desired time slot.

For example, an operation for designating the usage time slot may be accepted from the touch panel in the signage device 10. For example, a button for designating time slots such as "10:00 to 12:00," "12:00 to 15:00," and "15:00 to 18:00" may be provided, and touch input for any of these time slots may be accepted. These desired time slots may be accepted at any timing between step S102 and step S104.

Figure 9:
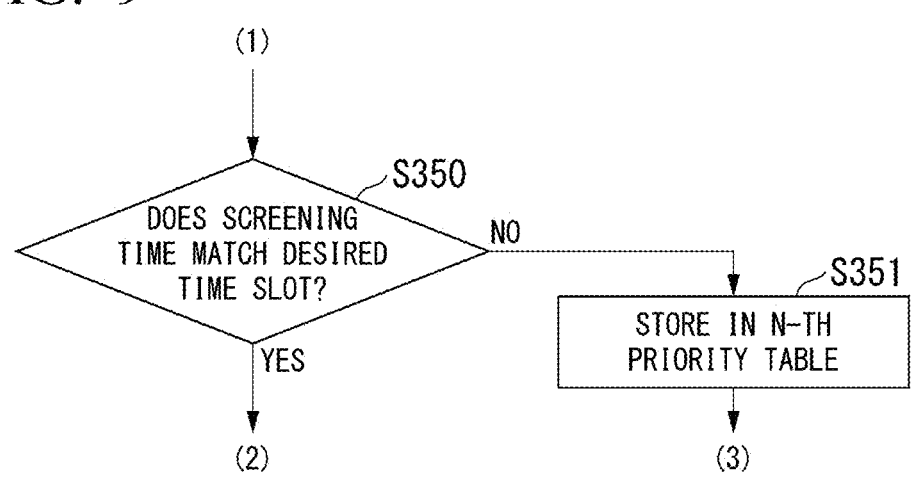
FIG. 9 is a flowchart illustrating a case where extraction conditions based on a desired time slot are determined.

FIG. 9 is a flowchart illustrating a case where extraction conditions based on a desired time slot are determined.

When making a determination based on the extraction conditions, the extraction unit 322 determines whether the next time frame (between the screening start time and the end time) falls within the desired time slot with respect to a movie ranked as a determination target (for example, a movie ranked first) (step S350). The extraction unit 322 advances the process to the determination of the next extraction condition in a case where the next time frame falls within the desired time slot (step S350—YES), and stores a movie ranked as a determination target (for example, a movie ranked first) at the top of the vacant region in the N-th priority table in a case where the next time frame does not fall within the desired time slot (step S350—NO) (step S351). After step S351, the server device 30 advances the process to step S314, adds 1 to the counter value, and then advances the process to step S303.

The processes of step S350 and step S351 may be executed after any of step S303, step S304, step S306, step S308, and step S310. In this case, priorities according to the order of the extraction conditions need only be assigned to the priority table. For example, in a case where the process of step S350 is performed after step S304 and a case where the determination in step S350 is NO, a priority between the third priority table and the fourth priority table described above need only be assigned to the N-th priority table.

In a case where the extraction conditions based on the above-described time slot are determined, it is possible to determine whether a movie can be watched in the desired time slot, and to register a movie for which the next time frame falls within the desired time slot in the display candidate table.

In a case where a movie extracted from the N-th priority table is displayed on the signage device 10, the time slot in which the movie is watched does not fall within the desired time slot, but the user can watch the movie by adjusting the convenience in at least any one of the time slots before and after the desired time slot.

By displaying a movie with the desired time period taken into account in this way, the user will be able to watch a movie at a more convenient time (such as, for example, a time when the user wants to watch it before the meal time slot), and it will also be possible to bring about a more effective promotional effect in having people watch movies.

According to the embodiment described above, the signage advertisement for a movie during the screening period of a movie theater can be displayed as an advertisement for the most suitable movie that can be watched by the user at the current point in time in accordance with the attributes of the user in front of the signage device 10 and the availability of seats. By installing the above-described signage device 10 in the vicinity of a movie theater, users can save themselves the trouble of searching for movies that they can watch on their own using terminal devices such as smartphones or tablets. In addition, for operators of movie theaters, even users who had not planned to watch a movie can become interested after viewing the advertisement on the signage device 10, which makes it possible to expect an increase in sales.

According to the embodiment described above, a case where movies are displayed on the signage device 10 has been described, but each movie is allocated a screening room, and thus a recommended facility (screening room) is displayed by displaying a recommended movie. That is, an example of a facility is a movie (screening room).

Next, a case where the facility is a restaurant will be described.

In a case where the facility is a restaurant, the signage device 10 is installed at an entrance, an information center, or the like in an area where a plurality of restaurants are installed, such as a downtown area or a station building.

In this case, the restaurant transmits the main target group of its own store as a group attribute to the server device 30 from a terminal device provided in the restaurant. This allows each restaurant to be stored in the list data for each group attribute. In addition, the ranking for each restaurant is written into the list data for each group attribute on the basis of the evaluation of each restaurant published on the Internet.

In addition, for each restaurant, the current availability status in the list data is updated from the terminal device of the restaurant at any time. Examples of the availability status include two 2-person tables available, one 4-person table available, two counter seats available, a 6-person table available in 15 minutes due to a 2-hour time limit, and the like. For seats which are unoccupied at this point of time, a time frame may be set between the current point in time and a certain time. The time frame in this case may be set on the basis of the average stay time when the restaurant is used. For example, if the average stay time is 2 hours, the time frame may be set to 2 hours, 2 hours and 30 minutes, or the like to include the extra time.

When a group including a plurality of users stands in front of the signage device 10, the signage device 10 uses the camera 11 to capture an image of a group including each user, estimates the user attributes of each user included in the group, and estimates the group attributes on the basis of the estimated user attributes of each user. Here, the desired time slot is input from the touch panel of the signage device 10, or in a case where there is no input, a certain period of time from the current time is accepted as the desired time slot.

The processing after the group attributes are estimated is similar to the processing from step S301 to step S317 described above. Thereby, restaurants corresponding to the group are read out from the display candidate table and displayed on the signage device 10. This makes it possible for the user to select a store he or she wants to visit from among the restaurant displayed on the signage device 10. In addition, here, the availability status of seats is also displayed, and thus it is also possible to confirm whether seats are available according to the number of people in the group, or the like.

In addition, the facility management device 20 is provided in each restaurant, captures an image of a user coming out of the restaurant, and transmits the captured image to the server device 30. The server device 30 counts the number of users who have come out of the restaurant on the basis of the captured image. Based on the count result, the ranking in the list data is updated, it is determined whether the user included in the captured image is the user whose image is captured in the signage device 10, feedback by the signage device 10 monitors which store the user came out of and specifies the actual user on the basis of the determination result, and it is determined whether the user is the person whose image is captured by the signage device 10. In a case where the user is the person whose image is captured by the signage device 10, it is assumed that the person has been attracted to the restaurant by displaying the guidance on the signage device 10, and the actual value of the measurement result is added.

In addition, a clerk at the cash register of a restaurant may ask a customer (user) whether he/she came to the store after seeing the guidance on the signage device, and have the customer input the result from the terminal device of the restaurant, to thereby add it as an actual value of being able to attract people to the restaurant by displaying the guidance on the signage device 10. In this case, it is not necessary to capture an image by the camera 21 of the facility management device 20.

According to this embodiment, the user can save himself or herself the trouble of using a terminal device or the like to find out which restaurant to use.

Figure 10:
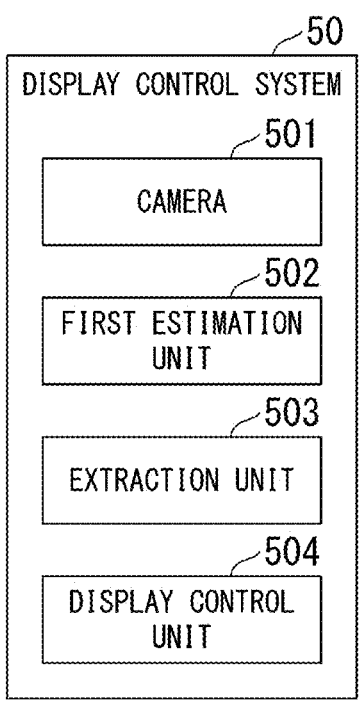
FIG. 10 is a schematic block diagram illustrating a configuration of a display control system 50 in another embodiment.

FIG. 10 is a schematic block diagram illustrating a configuration of a display control system 50 in another embodiment.

The display control system 50 includes a camera 501, a first estimation unit 502, an extraction unit 503, and a display control unit 504. The functions of the first estimation unit 502, the extraction unit 503, and the display control unit 504 of the display control system 50 are implemented as functions of a computer.

The camera 501 captures an image of a user. The first estimation unit 502 estimates the attributes of the user included in the image captured by the camera 501. The extraction unit 503 extracts candidates on the basis of the availability status of each service time frame from among the services corresponding to the estimated attributes. The display control unit 504 displays the extracted candidates on the display screen. This display screen may be a display screen of a display device connected to the outside of the display control system 50. Such a display device is connected to the display control system 50 through a communication cable and is provided in the vicinity of a location where customers are to be attracted.

In addition, a program for realizing the function of a processing unit in FIG. 1 is recorded in a computer readable recording medium, and thus construction management may be performed by causing a computer system to read and execute the program recorded in this recording medium. Meanwhile, the term "computer system" referred to here is assumed to include an OS and hardware such as peripheral devices.

In addition, the term "computer system" is also assumed to include a homepage providing environment (or a display environment) if a WWW system is used.

In addition, the term "computer readable recording medium" refers to a flexible disk, a magnetooptic disc, a ROM, a portable medium such as a CD-ROM, and a storage device such as a hard disk built into a computer system. Further, the "computer readable recording medium" is assumed to include recording mediums that hold a program for a certain period of time like a volatile memory inside a computer system serving as a server or a client. In addition, the above-mentioned program may be a program which is used for realizing a portion of the aforementioned functions, and may be a program which is capable of realizing the aforementioned functions by a combination of programs previously recorded in the computer system. In addition, the above program may be stored in a predetermined server, and the program may be distributed (downloaded or the like) through a communication line in response to a request from another device.

Although the embodiments of the present invention have been described in detail with reference to the drawings, a specific configuration is not limited to this embodiment, and design within the scope of the gist of the present invention, and the like are also included.

REFERENCE SIGNS LIST

10 Signage device
11, 21, 501 Camera
12 Video analysis unit
13 Display unit
14 Input unit
15, 32 Calculation unit
20 Facility management device
22 Video analysis unit
30 Server device
31 Storage unit
33 Effect measurement unit
50, S Display control system
321, 501 Acquisition unit
322, 503 Extraction unit
323, 504 Display control unit
502 First estimation unit

What is claimed is:

1. A display control system comprising:
a camera that captures an image of a user;
one or more memories that store a set of processor executable instructions;
one or more hardware processors configured to execute the set of processor executable instructions to cause the one or more hardware processors to:
estimate attributes of the user included in the image captured by the camera;
extract candidates from among services corresponding to the estimated attributes on the basis of an availability status of each service time frame;
display the extracted candidates on a display screen; and
a storage unit that stores a respective availability status for the respective service time frame of each service among the services to be provided,
wherein the candidates are extracted by referring to the respective availability status for the respective service time frame stored in the storage unit,
wherein the storage unit is allocated a ranking among attributes for the facility, and
wherein, as the candidates to be displayed, facilities are extracted, which correspond to an extraction condition in a relationship between the desired time slot and the respective availability status of the respective service time frame from among a plurality of facilities corresponding to the estimated attributes in descending order of the ranking.

2. A display control system comprising:
a camera that captures an image of a user;
one or more memories that store a set of processor executable instructions;
one or more hardware processors configured to execute the set of processor executable instructions to cause the one or more hardware processors to:

estimate attributes of the user included in the image captured by the camera;

extract candidates from among services corresponding to the estimated attributes on the basis of an availability status of each service time frame;

display the extracted candidates on a display screen; and a storage unit that stores a respective availability status for the respective service time frame of each service among the services to be provided, wherein candidates are extracted by referring to the respective availability status for the respective service time frame stored in the storage unit, wherein the storage unit is allocated a ranking among attributes for the facility, and wherein, as the candidates to be displayed, facilities are extracted, which correspond to an extraction condition in a relationship between the desired time slot and the respective availability status of the respective service time frame from among a plurality of facilities corresponding to the estimated attributes in descending order of the ranking, wherein, in a case where the number of candidates extracted as the candidates to be displayed does not reach a predetermined threshold number, facilities are extracted which have a high priority from among facilities that do not correspond to the extraction condition as the candidates to be displayed.

3. The display control system according to claim 2, wherein, in a case where the extraction condition is a first condition regarding whether a time from a start time of the desired time slot to a start time of the time frame is within a first reference time, facilities are extracted which are available in a time frame within the first reference time as facilities corresponding to the extraction condition.

4. The display control system according to claim 3, wherein, in a case where the number of users included in the captured image is plural and the extraction condition is a second condition regarding whether the plurality of users are able to use adjacent seats in the facility, facilities are extracted where the adjacent seats are able to be used as facilities corresponding to the extraction condition.

5. The display control system according to claim 4, wherein, in a case where the extraction condition is a third condition regarding whether the time from the start time of the desired time slot to the start time of the time frame is equal to or longer than a second reference time shorter than the first reference time, facilities are extracted which are available in a time frame equal to or longer than the second reference time as facilities corresponding to the extraction condition.

6. The display control system according to claim 5, wherein, in a case where the extraction condition is a fourth condition regarding whether there is a vacancy in a time frame closest to the start time of the desired time slot, a facility is extracted which has a vacancy in the closest time frame as a facility corresponding to the extraction condition.

7. The display control system according to claim 6, wherein, for facilities that do not correspond to any of the first to fourth conditions, in a case where the first condition is assumed to have a highest priority in a priority table in order of the first condition to the fourth condition, and the number of candidates extracted as the candidates to be displayed does not reach the predetermined threshold number, the facilities are extracted as the candidates to be displayed in order of the priority.

8. The display control system according to claim 7, wherein, in a case where facilities that do not correspond to the fourth condition are displayed on the display screen, there is displayed an availability status of a second closest time frame from the start time of the desired time slot in the facilities that do not correspond to the fourth condition.

9. The display control system according to claim 8, further comprising:

attributes of a user included in a captured image of the user coming out of the facility; and a first update unit that updates rankings among attributes for the plurality of facilities on the basis of estimation results of the second estimation unit.

10. The display control system according to claim 9, wherein the one or more hardware processors are configured to execute the set of processor executable instructions to cause the one or more hardware processors further to:

update, in a case where a facility to be used is reserved by the user from among candidates of the facilities displayed on the display screen, the rankings among attributes for the plurality of facilities on the basis of the attributes of the user.

11. A display control method comprising:

capturing an image of a user using a camera;

estimating attributes of the user included in the image captured by the camera;

extracting candidates from among services corresponding to the estimated attributes on the basis of an availability status of each service time frame;

displaying the extracted candidates on a display screen; and stores, in a storage unit, a respective availability status for the respective service time frame of each service among the services to be provided wherein extracting the candidates comprises extracting candidates by referring to the respective availability status for the respective service time frame stored in the storage unit, wherein a ranking among attributes is allocated to the storage unit for the facility, and wherein extracting the candidates comprises extracting, as the candidates to be displayed, facilities corresponding to an extraction condition in a relationship between the desired time slot and the respective availability status of the respective service time frame from among a plurality of facilities corresponding to the estimated attributes in descending order of the ranking.

* * * * *